Dec. 23, 1969     F. F. HAMILTON     3,486,167
AIRBORNE SEISMIC EXPLORATION METHOD AND SEISMIC
APPARATUS HAVING EARTH-PENETRATING MEANS
Filed July 23, 1968     4 Sheets-Sheet 1
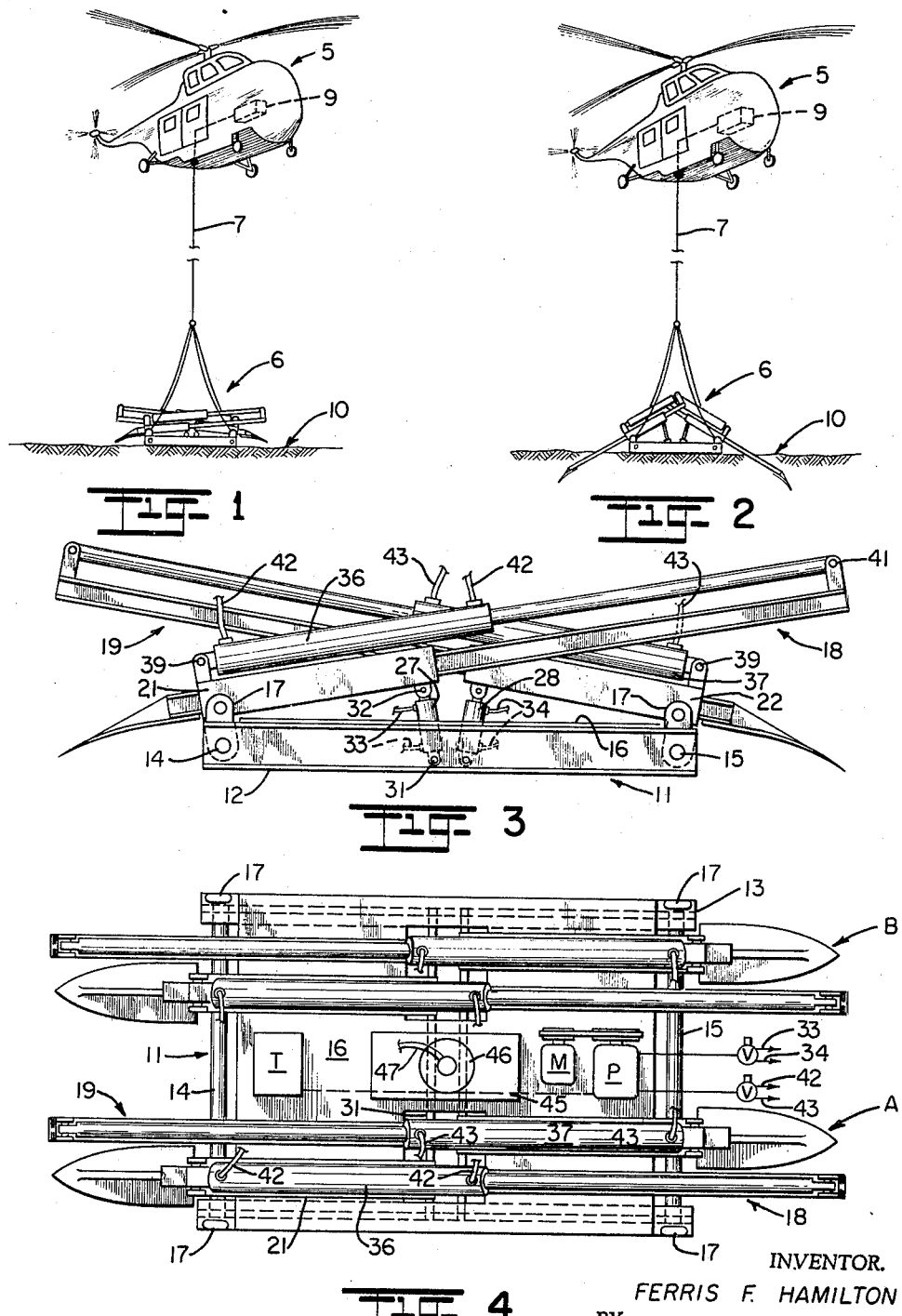
INVENTOR.
FERRIS F. HAMILTON
BY
John E. Reilly
ATTORNEY

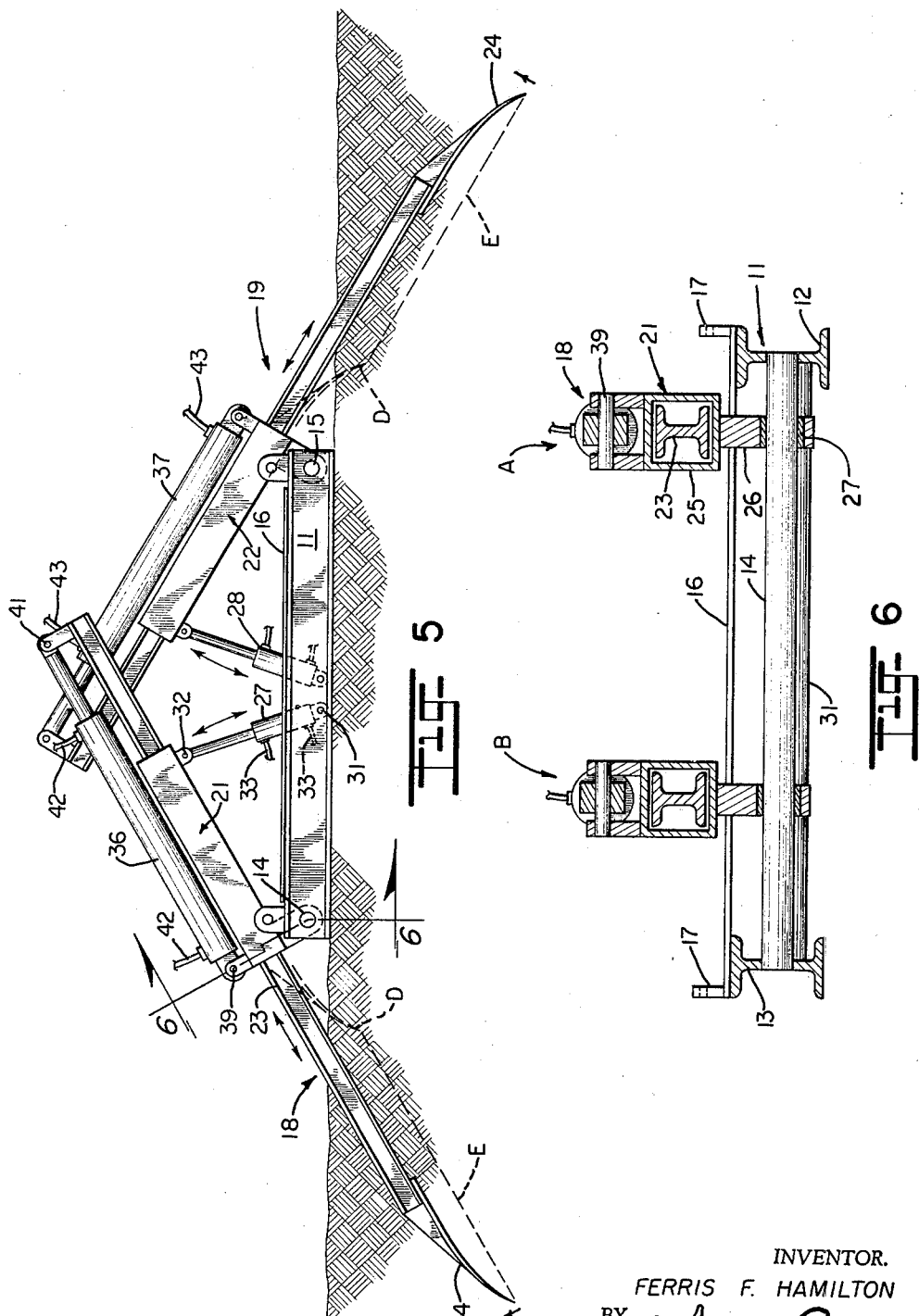

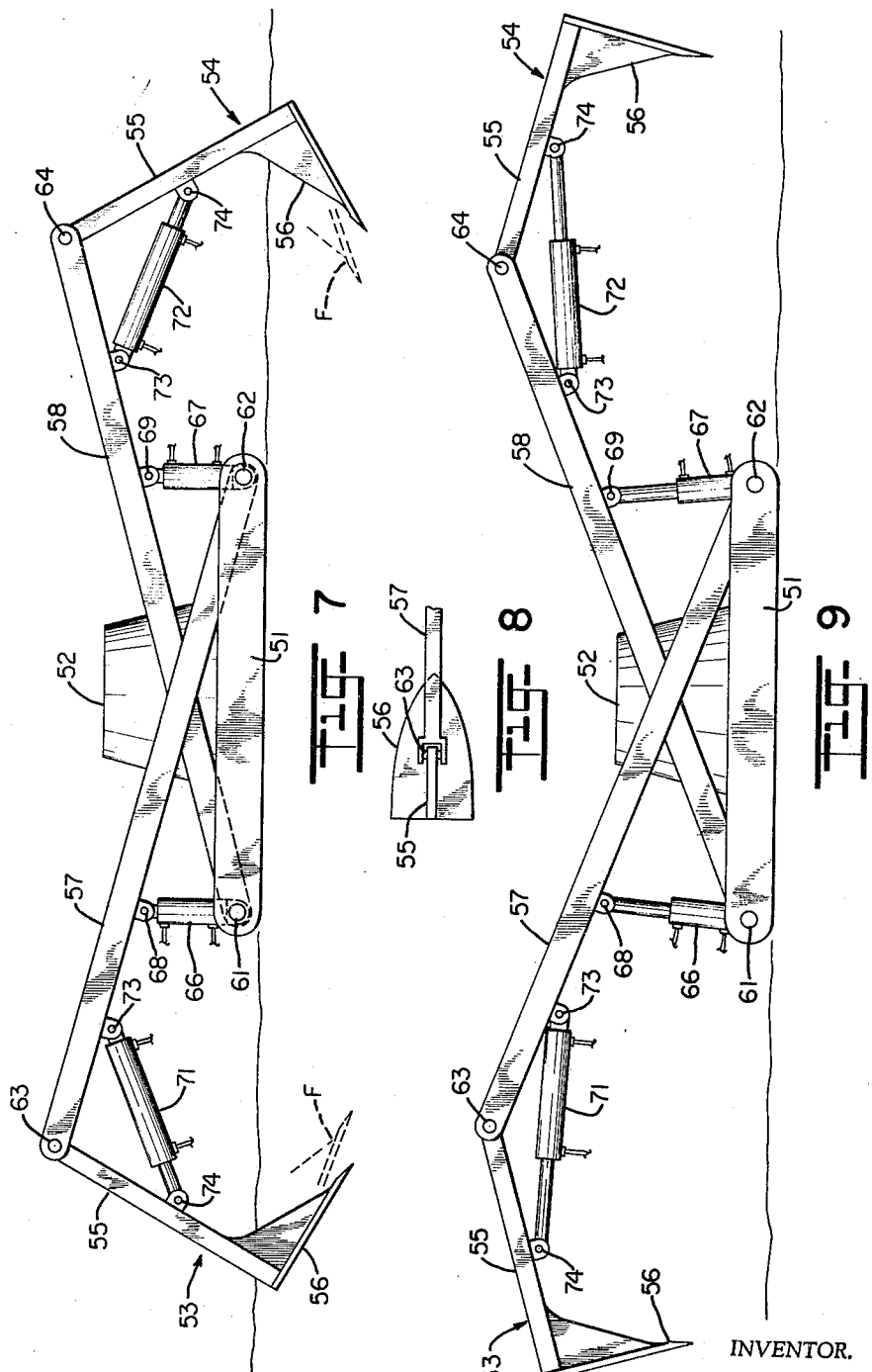

Dec. 23, 1969  F. F. HAMILTON  3,486,167
AIRBORNE SEISMIC EXPLORATION METHOD AND SEISMIC
APPARATUS HAVING EARTH-PENETRATING MEANS
Filed July 23, 1968  4 Sheets-Sheet 4
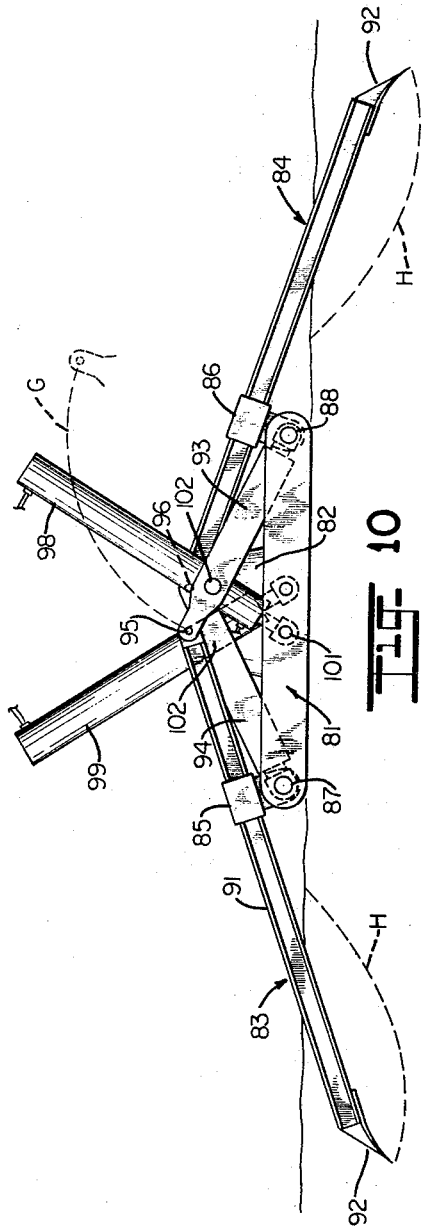
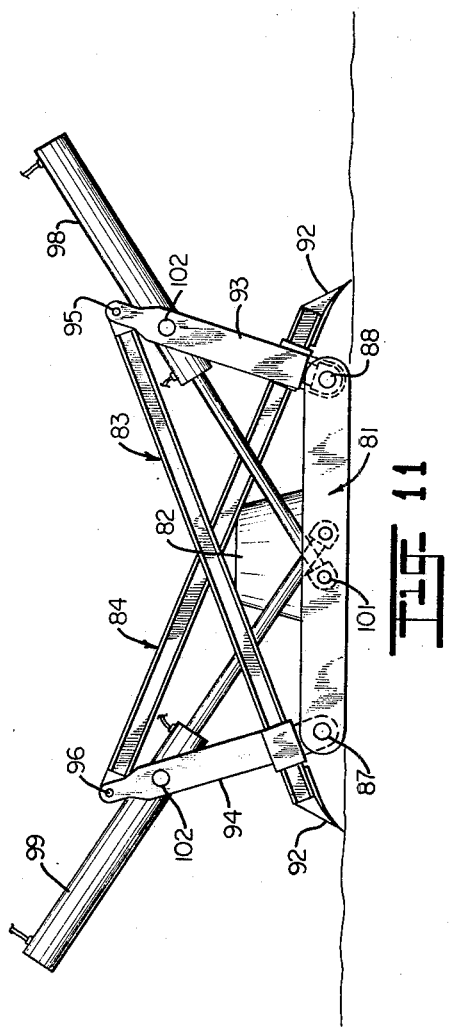
INVENTOR.
FERRIS F. HAMILTON
BY John E. Reilly
ATTORNEY

United States Patent Office 3,486,167
Patented Dec. 23, 1969

3,486,167
AIRBORNE SEISMIC EXPLORATION METHOD AND SEISMIC APPARATUS HAVING EARTH-PENETRATING MEANS
Ferris F. Hamilton, 320 High St., Denver, Colo. 80218
Filed July 23, 1968, Ser. No. 746,912
Int. Cl. G01v 1/00
U.S. Cl. 340—15.5                         18 Claims

ABSTRACT OF THE DISCLOSURE

In a seismic method and apparatus wherein seismic equipment is deployed by an aircraft within a preselected area for a seismic operation. A plurality of seismic devices may be deployed, activated and then removed and flown to another location within the area or another location while the aircraft is continuously airborne. Activation of each device may be carried out using a connection through a support cable while the aircraft hovers above or in the alternative after a device has been released from the aircraft, so that the aircraft is free to retrieve other seismic devices during the seismic operation. A grouping of the seismic devices so deployed may be simultaneously or successively activated and relocation of these devices may be by leap-frogging one over the others in a continuous cycle of operation. A seismic device arranged for energy input in an airborne seismic operation includes a lightweight platform having earth-penetrating means arranged on the platform to be driven downwardly into the earth at a selected angle inclined to the horizontal and moved upwardly to positively but releasably couple said platform to the earth.

---

This invention relates to a seismic exploration method and apparatus adaptable for suspension carriage and deployment by an aircraft and coupled to the earth at a preselected location, this invention being related to my copending application entitled Method and Apparatus for Airborne Seismic Exploration, field June 20, 1968, Ser. No. 738,572.

In my copending application above referred to there is shown and described a method for seismic exploration using an aircraft for transporting a seismic device or apparatus which is carried in a depending manner from the aircraft by a cable for placement at a preselected location and is arranged to be positively but releasably coupled or anchored to the earth prior to activation. The seismic device described therein may be activated from a control station remote from the generating location such as from the aircraft or may be activated by a person at the generating location.

The efficiency of such an operation will depend to a large degree on the procedure used in locating the seismic device with a maximum utilization of one or more air craft. In carrying out this procedure for seismic explora tion it is apparent that physical condition of the terrain is also an important consideration and any earth contacting platforms and positive coupling arrangements must be suitable for use under different terrain conditions likely to be encountered, such as dirt, mud, muskeg, marsh, slopes and tundrum. Accordingly, it is an object of this invention to provide a method of seismic exploration wherein a plurality of seismic devices arranged for airborne carriage by an aircraft are successively flown to a location and relocated by the aircraft in an efficient manner.

Another object of this invention is to provide a novel and improved seismic energy input apparatus adaptable for use in a variety of terrain conditions which will positively and releasably couple a seismic energy source to the earth's surface.

Another object of this invention is to provide a seismic device capable of being coupled to the earth's surface which includes oppositely disposed cooperative earth-penetrating members directed at a relatively shallow angle to the horizontal from a support on a ground contacting base and are arranged to be moved upwardly after a downward penetrating stroke to pull the device against the earth's surface for maximum efficiency.

In accordance with the present invention, seismic equipment is flown into a test area and relocated after activation in a continuous seismic testing operation. Activation of these seismic devices may be while the aircraft is hovering above or after the aircraft has been released and is retreiving another device and a plurality of deployed seismic devices may be simultaneously or successively activated as desired. Movement of each seismic device after activation may be in a leap-frogging step by lifting and flying it over an intervening group of devices to a succeeding location. There is provided a seismic device particularly adaptable to different terrains such as muskeg, marshes, mud and the like not usually accessible to wheeled vehicles including a platform having earth penetrating means including interchangeable blades arranged to be driven into the earth generally longitudinally and then upwardly against the overburden to draw the platform tightly against the earth's surface. The earth penetrating means are retracted after activation and the device is flown to the succeeding location.

Other objects, advantages and capabilities of the present invention will be more apparent as the following description proceeds taken in conjunction with the drawings, in which:

FIGURE 1 is a generally schematic elevation view depicting one form of seismic energy device suspended from a helicopter embodying features of the present invention deployed on the earth's surface with its earth-penetrating members shown in a raised position.

FIGURE 2 is a generally schematic elevation view depicting the seismic energy device of FIGURE 1 in a lowered position coupled to the earth with the helicopter hovering above.

FIGURE 3 is a side elevation view of the seismic energy device of FIGURE 1 drawn to an enlarged side.

FIGURE 4 is a top plan view of the device shown in FIGURE 3.

FIGURE 5 is an enlarged side elevation view of the device shown in FIGURE 2 illustrated as positively coupled to the earth.

FIGURE 6 is a sectional view taken along lines 6—6 of FIGURE 5 showing the particular manner of slidably and pivotally mounting the earth-penetrating members on the base.

FIGURE 7 is a side elevation view of another form of seismic energy device embodying features of the present invention.

FIGURE 8 is a fragmentary top plan view of the back hoe blade member of FIGURE 7.

FIGURE 9 is a side elevation view of the device of FIGURE 7 with the blades being elevated to a raised position above the ground surface to release the platform.

FIGURE 10 is a side elevation view of yet another form of seismic energy device embodying features of the present invention illustrated in a lowered earth-penetrating position; and FIGURE 11 is a side elevation view of the device of FIGURE 10 shown in a raised or retracted position.

Referring now to the drawings, and as described in my copending application, preferred airborne apparatus includes an aircraft 5 such as a helicopter having a seismic device 6 herein illustrated as an energy input device 6 suspended therefrom by a cable 7 attached to the bottom of the aircraft; and the aircraft may suitably include an electric power source and control box 9 located in the aircraft.

In carrying out an airborne seismic operation on an essentially continuous basis, a plurality of seismic devices may be landed in succession by a single aircraft. These seismic devices may be arranged to produce energy in to the earth or may be the pick-up and recorder devices of seismic waves. In a preferred practice in accordance with the present invention these seismic devices are suspended for airborne carriage as shown in FIGURES 1 and 2 and each in a consecutive order is flown to a location and deployed within a particular area. After lowering the airborne seismic device into position it may be activated from the aircraft while hovering above or the device may be released so that the aircraft may fly from the location and retrieve another piece of equipment or similar device. During the absence of the aircraft, personnel at the location may activate or operate the seismic device which has been lowered to the earth. A group of the lowered devices may be activated simultaneously after being positioned or successively after they are placed in position.

In the case of seismic pick-up devices such as geophones it is preferred to arrange them in a line or straight pattern along a course within a preselected area to be tested and after a pick up of the seismic signals they are successively leap-frogged; each device being moved over the intervening devices by lifting and flying it to a succeeding location in a continuous operation.

One embodiment of seismic energy input device which is especially suitable for use near roots or stubs where the earth-penetrating members might not get fully extended is illustrated in FIGURES 1 through 6. This device comprises a base or platform 11 adapted to be placed on the earth's surface and is formed of lightweight construction to permit suspension and movement by an aircraft. This device includes earth-penetrating members hereinafter described more fully associated therewith to positively but releasably couple the platform to the earth's surface at a preselected location designated at 10.

As shown, the platform 11 comprises a pair of spaced side I-beams 12 and 13 interconnected by transverse shafts 14 and 15 at each end to form a rigid box-like frame. A plate 16 extends across the top to provide a support surface for other parts hereinafter described. Lugs 17 are provided at each corner of the platform on an upper surface thereof for attachment to the lower ends of the cable 7 to suspend the assembly in a balanced manner.

The coupling device or anchor for the base 11 comprises a pair of similar, oppositely disposed earth-penetrating members generally designated by numerals 18 and 19 which are supported on the base by guide mounts 21 and 22, respectively. In order to permit slidable and pivotal movement of the earth penetrating members, mounts 21 and 22 are pivotally supported from opposite sides of the platform 11 on shafts 14 and 15, respectively and in a manner to be hereinafter described serve to direct or guide the earth-penetrating members obliquely into the earth both downwardly and outwardly in opposite directions away from each other. Members 18 and 19 may be arranged in multiples in side-by-side relationship on the common platform, and in the form shown there is provided a set of two such pairs designated A and B.

Each earth-penetrating member is of identical construction and includes a shank 23, I-shaped in cross-section, having a sharpened edge or blade portion 24 at the lower end thereof which in the form shown in FIGURES 1 through 6 is generally downturned along its length to assist in drawing the base against the earth's surface as it is driven downwardly at an angle inclined to the horizontal. In turn, each mount comprises an upper guide portion 25 shaped to encompass and slidably support the shank portion 23 in its slidable movement therethrough and a lower pivot portion 26 arranged with a suitable internal bearing 27 which pivots on the lateral shaft forming a portion of the base 11.

As noted in FIGURE 4, the blade portions 24 are generally broad in width and thereby provide a substantial surface area which is effective in helping to draw the platform against the earth when they are moved upwardly against the overburden. This substantial surface area is particularly effective in soil where a narrow sharpened or pointed member would pull through the soil without providing a grasping or holding effect. The blade portions 24 are preferably interchangeable on the shank 23 as by using a clevis and rod type coupling as shown or the equivalent so that different sizes and shapes of blades may be substituted for different terrain; the blade bend and blade area being proportioned to the type of terrain.

A pair of linear drive members 27 and 28 are provided for positively driving the mounts 21 an 22 respectively up and down about their respective pivots and these drive members are located centrally of the base in an upright side-by-side relation. Each of these drive members includes a double-acting cylinder and an associaed piston which reciprocates in the cylinder. More specifically, the lower end of the cylinder is mounted on a lower pivot 31 on the base and the upper end of the associated piston is attached at a lug or clevis supported upper pivot 32 at the upper end of the guide mount so that when the piston of each of the drive members 27 and 28 is forced outwardly through its associated cylinder it will drive the associated mount upwardly to increase the angle of penetration of the earth-penetrating member; and when the piston is retracted into the cylinder it will decrease the angle of earth penetration.

For purposes of illustration where hydraulically operated cylinder and piston units are provided, pressure and return lines 33 are associated with drive member 27 and pressure and return lines 34 for drive member 28, these lines being connected at opposite ends of the associated cylinders and leading to and from a common regulated source of supply so that the drive members 27 and 28 reciprocate in a coordinated manner. In a conventional manner, the source of supply may be defined by a pump P, reservoir or tank T, a motive source M for the pump and a pilot operated valve V to control the flow of fluid to and from opposite ends of the cylinders 27 and 28.

Another pair of cooperating drive members 36 and 37 are provided for synchronously and reversibly driving the earth-penetrating members 18 and 19, respectively, in a generally longitudinal direction through their respective mounts. Each of these drive members is also defined by a double-acting cylinder and piston combination with the piston reciprocating in the cylinder. For each drive member the lower end of its cylinder is mounted on a pivot 39 formed by upstanding clevis and a pin at the lower end of the mount and the upper end of its piston is mounted on an upper pivot 41 formed by a clevis arranged in an upstanding manner from the upper end of the associated shank portion. The cylinder of drive member 36 has pressure and return lines 42 and the cylinder of drive member 37 has pressure lines 43 associated in the control on the platform with a valve V' leading from the pump P, as best seen from FIGURE 4 so that the earth-penetrating members are driven downwardly and retracted in a coordinated relation by the actuation of valve V'.

The source of seismic energy is preferably defined by a vibrator 45 disposed centrally of the plate 16 containing an electromagnetic or hydraulic piston drive 46 to generate vibrational impulses which are transmitted into the earth. A line 47 is shown leading to the vibrator 45 which may be actuated in conjunction with other apparatus on the base or from the aircraft depending on the type of vibrator being employed.

In a detailed sequence of operation the seismic input device 6 is first placed on the earth's surface with the earth-penetrating members 18 and 19 disposed in a retracted raised position as shown in FIGURES 1 and 3. In extending the earth-penetrating members from the retracted position of FIGURE 3 to the extended earth coupled position of FIGURE 5, valve V may be actuated first to force the pistons out of the cylinders in drives 27 and 28 to pivot the opposing mounts upwardly at their inner ends and increase the angle of penetration. In the form shown, this angle is relatively shallow and about 30° to the horizontal when the pistons are fully extended and the blade portion 24 is at an initial point D, as indicated in dash lines in FIGURE 5. Valve V' is then actuated to draw the pistons into the cylinders of drives 36 and 37 to drive the earth-penetrating members 18 and 19 downwardly and outwardly along a path designated E to a fully extended position, if possible. In the event roots, rocks, or stumps are encountered one or the other of the earth-penetrating members may not extend the full depth shown but it is apparent that some degree of peneration will be adequate. Finally, the blade portion 28 of each earth-penetrating member is raised slightly in the direction indicated by arrows about pivots 14 and 15 against the overburden again by activating valve V so as to reverse the pistons in the cylinders of drive members 27 and 28 which draws the inner ends of the associated mounts slightly downward. This produces an opposite reaction to force the platform 11 down tightly agains the earth's surface for maximum input efficiency.

The drive element 46 is then activated to generate an input into the earth's surface. After seismic input generation valve V' will be activated to force the pistons from the cylinders of drive members 36 and 37 to retract the earth-penetrating members from the earth along path E with the valve V' then activated to return the mounts to the original position shown in FIGURE 3. The aircraft will then elevate apparatus 6 and fly it to the next location.

Thus, in soft or marshly areas the earth-penetrating members will spear downwardly and outwardly in opposite directions, and the final upward lifting action of the blade members against the wet fibrous mass on both sides urge the platform downwardly and couple it firmly to the earth for application of seismic input vibrations.

The embodiment of FIGURES 7, 8 and 9 is especially suitable for terrain such as soft dirt, mud, or the like where there is lacking appreciable rocks or stumps and comprises a platform or base 51 having a vibrator 52 mounted thereon to generate seismic energy. A pair of oppositely disposed earth-penetrating members generally designated by numeral 53 and 54 are mounted on the platform and are arranged to extend inwardly and downwardly toward one other. These earth-penetrating members are identical in construction and may be characterized as being of a back hoe shape with a shank 55 having a spade-like blade member 56 disposed at right angles to the shank; and the opposing blade members are angled inwardly toward one other when driven into the earth at a shallow angle in the manner to be more fully described hereinafter.

The mount for the earth-penetrating members 53 and 54 includes a pair of arms 57 and 58, respectively, having lower ends attached to opposite ends of the platform 51 on pivots 61 and 62, and these arms cross centrally of the platform and their upper ends extend substantially beyond the ends of the platform. The upper end of member 53 is attached to the upper end of arm 57 at pivot 63 and the upper end of member 54 is attached to the upper end of arm 58 at pivot 64. In this manner, the members in effect depend from the crossing arms and are pivotally supported therefrom at points which are substantially spaced from each end of the platform.

A pair of linear drive members 66 and 67 are provided for positively driving arms 57 and 58 up and down about their respective pivots. These drive members are located at the ends of the platform on the same side as their associated earth-penetrating members. Each drive member is identical and includes a double acting cylinder having pressure and return lines and a piston which reciprocates in the cylinder in order to drive the arms in either direction. More specifically, the lower end of the cylinder of drive member 66 is mounted at pivot 61 on the base and the upper end of the associated piston is attached at a lug or clevis supported pivot 68 on the undersurface of arm 57. Similarly, the lower end of the cylinder of drive member 67 is mounted at pivot 62 and the upper end of the associated piston is attached by a lug or clevis supported pivot 69 on the under surface of arm 58.

Another pair of linear drive members 71 and 72 are provided for synchronously and reversibly driving the earth-penetrating members into the earth to positively couple the assembly to the earth and retract the same after each sesimic energy input. Again, each of the drive members 71 and 72 is defined by a double acting cylinder with pressure and return lines and a piston in the cylinder. These drive members are arranged in a like manner on both sides, having an upper end of the cylinder attached at a lug or clevis supported pivot 73 on the underside of the arm and the lower end of the piston attached at a lug or clevis supported pivot 74 on the inner side of shank 55. With this arrangement, when the pistons are drawn into the cylinders of drive members 56 and 57 the earth-penetrating members are moved toward the earth and the angle of penetration increases. The reverse is true when the pistons of drive members 71 and 72 are drawn into the cylinders, the earth-penetrating members are pulled toward each other and the blade members penetrate into the earth, as shown in FIGURE 7.

The vibrator 52 and earth-penetrating members 53 and 54 may be driven from a common regulated power source mounted on the platform in the same manner as is shown and described with reference to FIGURES 1 through 6, but the power source has not been illustrated in the remaining figures to avoid unnecessary duplication.

In a detailed description of operation for the embodiment shown in FIGURES 7 through 9 the apparatus is first positioned on the earth's surface with the earth-penetrating members in the retracted position above the earth. The fully retracted or uppermost position of these earth-penetrating members is shown in FIGURE 9, in which case the pistons of all of the drive members are fully extended from their associated cylinders. However, it is understood that for airborne carriage, either pair of drive members may have their pistons partially retracted so that the earth-penetrating members would be approximately at ground level.

As the first step, the pistons of the drive members 66 and 67 may be retracted into the cylinders followed by retraction of the pistons of drive members 71 and 72 into their cylinders. In this way the members 53 and 54 will pivot about their respective pivots 63 and 64 and penetrate into the earth in the manner shown in FIGURE 7. A further earth-penetrating position would be approximately at position F, indicated in dash lines. In this embodiment the inturned direction of movement of the earth-penetrating members will serve to draw the platform 51 downwardly against the earth. However, for additional coupling effect, as a final step the pistons of the drive members 66 and 67 may be driven upwardly from their cylinders to urge the blade members 56 upwardly against the overburden and thereby further draw the platform 51 against the earth's surface in a manner similarly described with reference to FIGURES 1 through 6. Following seismic input by the vibrator 52 the pistons are driven from the cylinders of drive members 71 and 72 to pivot members 53 and 54 about pivots 63 and 64 and retract the blade member from the earth followed by driving the pistons from the cylinders of drive members 66 and 67 to return them to an upward retracted position as shown in FIGURE 9.

In yet another embodiment illustrated in FIGURES 10 and 11, there is shown an arrangement which requires only a single drive member for each earth-penetrating member. This arrangement is suitable for wet or soggy, fibrous terrain, such as encountered in marshes, and is most effective when the earth-penetrating member can be fully extended. To this end, the embodiment comprises a platform 81 having a vibrator 82 or equivalent source of seismic energy mounted thereon. A pair of oppositely disposed earth-penetrating members 83 and 84 are mounted on the platform on guide mounts 85 and 86 respectively, at opposite ends thereof. The guide mounts shown are generally similiar to those illustrated and described with reference to FIGURES 1 through 6 including the upper guide portions through which the earth-penetrating members may slidably move and the lower pivots designated 87 and 88 at opposite ends of the platform. This arrangement similarly permits slidable and pivotable movement of the earth penetrating members in the guide mounts outwardly and oppositely away from each other. Each earth-penetrating member includes an elongated shank portion 91 having an interchangeable blade member 92 detachably mounted at its lower end.

In this embodiment the upper end of each earth-penetrating member is arranged to move or swing with respect to the platform through a radius established by lever arms 93 and 94. Member 83 has its upper end attached to the upper end of arm 93 at a pivot 95 and the lower end of arm 93 is attached to the platform at pivot 88. Similarly member 84 has an upper end attached to the upper end of the arm 94 at pivot 96 and the lower end of arm 94 is attached at pivot 87.

A pair of linear drive members 98 and 99 are operative to positively drive the earth-penetrating members 83 and 84, respectively, into the earth. These drive members also include a double acting cylinder having pressure and return lines and a piston arranged for reciprocal movement by a valve actuation through each cylinder and the lower end of the piston is pivotally mounted as at pivot 101 centrally of the platform. Upper portions of the lever arms 93 and 94, below its connection to the earth-penetrating member, are attached to pivot 102 located adjacent to the lower portions of their associated cylinders. In this manner reciprocal movement of the drive members rotate the lever arms about their lower pivots 87 and 88 to urge the upper ends of the earth-penetrating members through an arc or path designated G in FIGURE 10. As a result, the members 83 and 84 are driven downwardly and outwardly at a relatively shallow angle to the earth and are driven upwardly toward the end of the stroke along a path generally designated H in FIGURE 10. The final upward movement will produce an additional pressing down of the platform against the earth's surface for more effective seismic input in the same manner as hereinabove described. The earth-penetrating members are retracted from the earth simply by actuating the drive members 98 and 99 to drive the pistons from their cylinders and force the lever arms laterally and away from each other to the position generally shown in FIGURE 11. In the latter position, it will be noted that the earth-penetrating members 83 and 84 are in a substantially criss-cross or X shaped relationship.

The general sequence of operation for the embodiment shown in FIGURES 10 and 11 is similar to that previously described with reference to the other embodiments. The apparatus is placed on the earth's surface with the earth-penetrating members retracted, as shown in FIGURE 11. The drive members 98 and 99 are actuated from a suitable regulated source of supply so that the pistons are drawn into the associated cylinders to produce an outward, downward, then upward driving effect. The vibrational source will be actuated to generate a seismic input into the earth's surface, followed by retraction of the earth-penetrating members by reversal of the drive members 98 and 99.

It is understood that the earth-penetrating members may be arranged in one or a plurality of sets disposed in a side-by-side relationship on the common platform as discussed with reference to FIGURES 1 through 6, but have not been illustrated in the forms shown in FIGURES 7 through 11 to avoid unnecessary duplication.

From the foregoing it is apparent that the above-described procedure and apparatus affords many advantages over previous seismic exploration practices. The whole operation may move forward entirely by air, with no stops to drill holes, etc., and one helicopter bearing a seismic device would be continuously in operation, hovering, or moving and at regular intervals, gradually lowering the device into contact with the ground, coupling it to the earth's surface, activating the seismic device, and then releasing and retracting the coupling and moving it to the next location. The positive coupling of the platform to the earth by means of a spearing action permits a lighter assembly for added mobility during flight, yet effectively presses it against the earth's surface for maximum full energy input. The shaping and position of the spear-like earth-penetrating members and associated regulated power source is constructed to be simple, rugged and parts may be easily repaired and replaced with interchangeability of the blades for different terrain. In soft mud, flat blades work well due to the weight of mud on top and the suction under the blade. All cables may be made of a quick disconnect in case the pilot needs to drop the load.

Although the present invention has been described with a certain degree of particularity, it is understood that the present disclosure has been made only by way of example and that changes in details, structure and system components may be made without departing from the spirit and scope thereof.

What is claimed is:
1. A method for airborne seismic exploration using a plurality of seimic devices comprising the steps of flying the seimic device to locations within a preselected area, deploying each seismic device from an elevated airborne position to the earth, releasing each seismic device from the aircraft after said deployment, extending earth-penetrating means into the earth to couple the device thereto and successively leap-frogging each seismic device by lifting and flying it from the aircraft over an intervening group of seismic devices on the earth to a succeeding location within said area.

2. A method as set forth in claim 1 wherein said seismic devices are located on the earth in a group along a substantially linear path at successively spaced intervals.

3. A method as set forth in claim 1 including the further step of simultaneously activating each seismic device after its deployment on the earth.

4. A method as set forth in claim 1 including the step of successively activating each seismic device after its deployment on the earth 5. A method as set forth in claim 1 wherein after release of a seismic device said aircraft is flown from the location to retrieve another seismic device from another location.

6. A seismic device adapted for placement on the earth's surface for seismic exploration comprising a platform, a releasable earth coupling for the platform including earth-penetrating means arranged on the platform for movement from an upper raised position to a lower extended position into the earth at a downward angle inclined to the horizontal and means for driving said earth-penetrating means in a downward penetrating stroke into the earth for coupling the platform to the earth and for driving said earth-penetrating means in an upward return stroke to return the earth-penetrating members to the raised position, and release the platform from the earth.

7. A seismic device as set forth in claim 6 wherein said earth-penetrating means is first moved in its penetrating stroke downwardly into the earth and its outer end portion is then moved upwardly against the overburden of the earth.

8. A seismic device as set forth in claim 6 wherein said earth-penetrating means are moved at an angle to the horizontal of not greater than 30 degrees.

9. Seismic energy surface input apparatus adapted for airborne carriage and placement on the earth's surface for seismic exploration comprising a platform having an undersurface adapted to contact the earth's surface, a releasable earth coupling means for the platform including a pair of oppositely disposed earth-penetrating members mounted on the base for movement from an upper raised position to a lower extended position into the earth at an angle inclined to the horizontal means driving said earth-penetrating members in a downwardly directed coordinated movement for coupling the platform to the earth and for driving said earth-penetrating members to the raised position to release the platform, means on the platform for generating seismic energy to transmit a seismic input into the earth when coupled thereto by said earth-penetrating members.

10. Seismic energy surface input apparatus as set forth in claim 9 including means for controlling the angle of inclination of each of the earth-penetrating members as each is driven outwardly in order to draw said platform tightly against the earth.

11. Seismic energy surface input apparatus as set forth in claim 9 wherein said earth-penetrating means is normally disposed in an inclined, downward and outward direction.

12. Seismic energy surface input apparatus as set forth in claim 9 wherein said earth-penetrating members are arranged for being driven in a downward, outward and then upward direction.

13. Seismic energy surface input apparatus as set forth in claim 9 wherein said pair of earth-penetrating members are arranged in at least two sets disposed in a side-by-side oppositely directed relation on a common platform.

14. Seismic energy surface input apparatus as set forth in claim 9 wherein said earth-penetrating means is normally inturned toward each other for inward and downward angular advancement into the earth.

15. Seismic energy surface input apparatus as set forth in claim 14 wherein each said blade member is in the form of a back hoe for penetrating the earth.

16. Seismic energy surface input apparatus as set forth in claim 9 wherein each said earth-penetrating member is generally spear-shaped and includes an elongated shank portion having a sharpened blade member at its lower end.

17. Seismic energy surface input apparatus as set forth in claim 16 wherein said blade member is generally broad in shape to hold against upward movement in the earth.

18. A method for airborne seismic exploration using a seismic device comprising the steps of successively suspending the seismic device from an aircraft and flying it to a location within a preselected area, deploying the seismic device from an elevated airborne position to the earth, and extending earth-penetrating means supported on the device into the earth at an angle inclined to the horizontal.

References Cited

UNITED STATES PATENTS

| | | | |
|---|---|---|---|
| 3,062,315 | 11/1962 | Herzog | 181—.5 |
| 3,327,287 | 6/1967 | Ball et al. | 340—15.5 |

RODNEY D. BENNETT, Jr., Primary Examiner

DANIEL C. KAUFMAN, Assistant Examiner

U.S. Cl. X.R.

181—.5